United States Patent [19]

Quigley

[11] Patent Number: 5,188,872
[45] Date of Patent: Feb. 23, 1993

[54] COMPOSITE STRUCTURAL MEMBER WITH HIGH BENDING STRENGTH

[75] Inventor: Peter A. Quigley, Cataumet, Mass.

[73] Assignee: Fiberspar, Inc., West Wareham, Mass.

[21] Appl. No.: 793,434

[22] PCT Filed: Jun. 14, 1990

[86] PCT No.: PCT/US90/03439

§ 371 Date: Dec. 13, 1991

§ 102(e) Date: Dec. 13, 1991

Related U.S. Application Data

[63] Continuation-in-part of Ser. No. 366,464, Jun. 14, 1989, Pat. No. 5,048,441.

[51] Int. Cl.$^5$ ............... B32B 5/06; B29D 22/00; B63B 15/00; B31C 00/00
[52] U.S. Cl. ................... 428/36.2; 114/90; 114/91; 114/93; 114/103; 343/872; 428/36.1; 428/36.3; 428/113; 428/257; 428/258; 428/259; 428/284; 428/294; 428/302; 428/408; 428/902
[58] Field of Search ............ 428/36.2, 36.3, 113, 428/284, 294, 302, 408, 902, 257, 258, 259, 36.1; 156/173; 114/103, 90, 91, 93; 343/872

[56] References Cited

U.S. PATENT DOCUMENTS

| | | | |
|---|---|---|---|
| Re. 29,112 | 1/1977 | Carter | 156/153 |
| Re. 30,489 | 1/1981 | Abbott | 156/175 |
| 2,602,766 | 7/1952 | Francis | 428/36.2 |
| 3,007,497 | 11/1961 | Shobert | 428/36.2 |
| 3,256,125 | 6/1966 | Tyler | 156/184 |
| 4,023,801 | 5/1977 | VanAuken | 273/80 B |
| 4,171,626 | 10/1979 | Yates et al. | 64/15 |
| 4,248,062 | 2/1981 | McLain et al. | 64/15 |
| 4,268,561 | 5/1981 | Thompson et al. | 428/111 |
| 4,612,241 | 9/1986 | Howard, Jr. | 428/294 |
| 4,625,671 | 12/1986 | Nishimura | 114/103 |
| 4,657,795 | 4/1987 | Foret | 428/298 |
| 4,668,318 | 5/1987 | Piccoli et al. | 156/149 |
| 4,699,178 | 10/1987 | Washkewicz et al. | 138/125 |
| 4,716,072 | 12/1987 | Kim | 428/212 |
| 4,759,147 | 7/1988 | Pirazzini | 43/18.5 |

OTHER PUBLICATIONS

"Tygon Tubing" Bulletin T-104, Norton Performance Plastics, Akron, Ohio.
International Search Report for Application PCT/US90/03439.

Primary Examiner—George F. Lesmes
Assistant Examiner—James D. Withers
Attorney, Agent, or Firm—Lahive and Cockfield

[57] ABSTRACT

A composite member (10) features a unique ply geometry which contributes to improved bending strength. The composite is constructed of a plurality of plies, each comprising a fiber component disposed within a polymer matrix. An inner ply (16) has a fiber component (18) which has fibers which are circumferentially extending. An intermediate ply (22) has first axially extending fibers (24) which are disposed about the circumference of the composite, as well as second axial fibers (30) which are interwoven with helically oriented fibers (36) and embedded in a polymer matrix (14). An outer layer (38) is similar to the inner layer as it features circumferentially extending fibers (40) which are embedded in a polymer matrix.

The composite materials may be used to manufacture a wide range of items which require light weight combined with high strength.

18 Claims, 4 Drawing Sheets

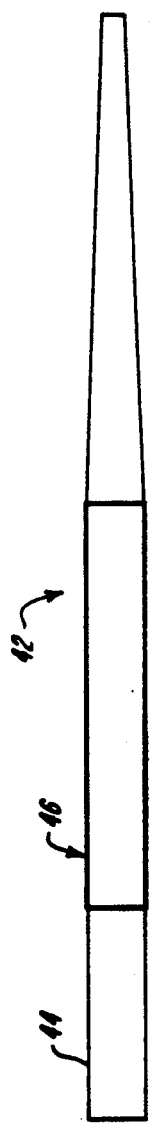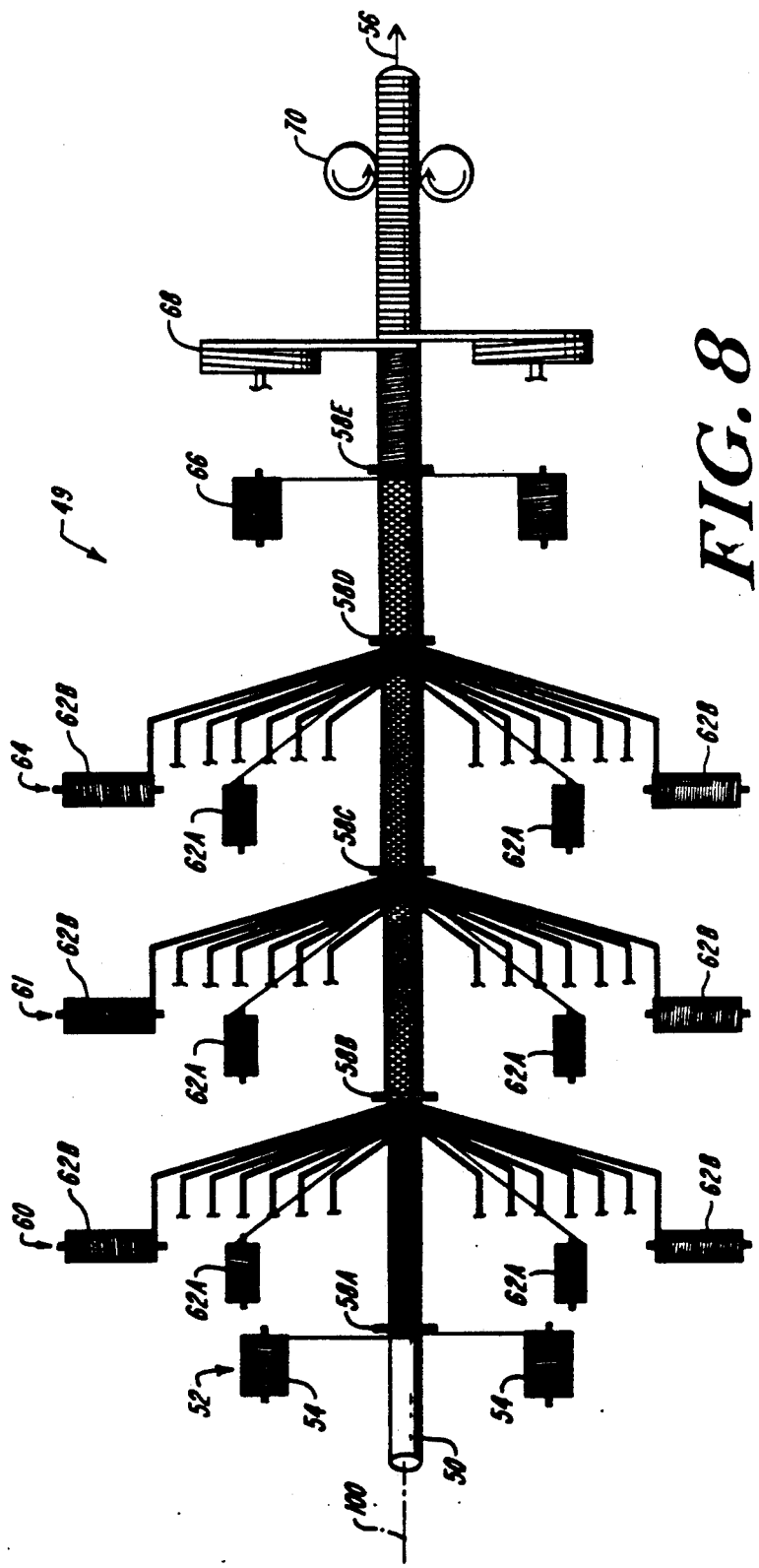
FIG. 7
FIG. 8

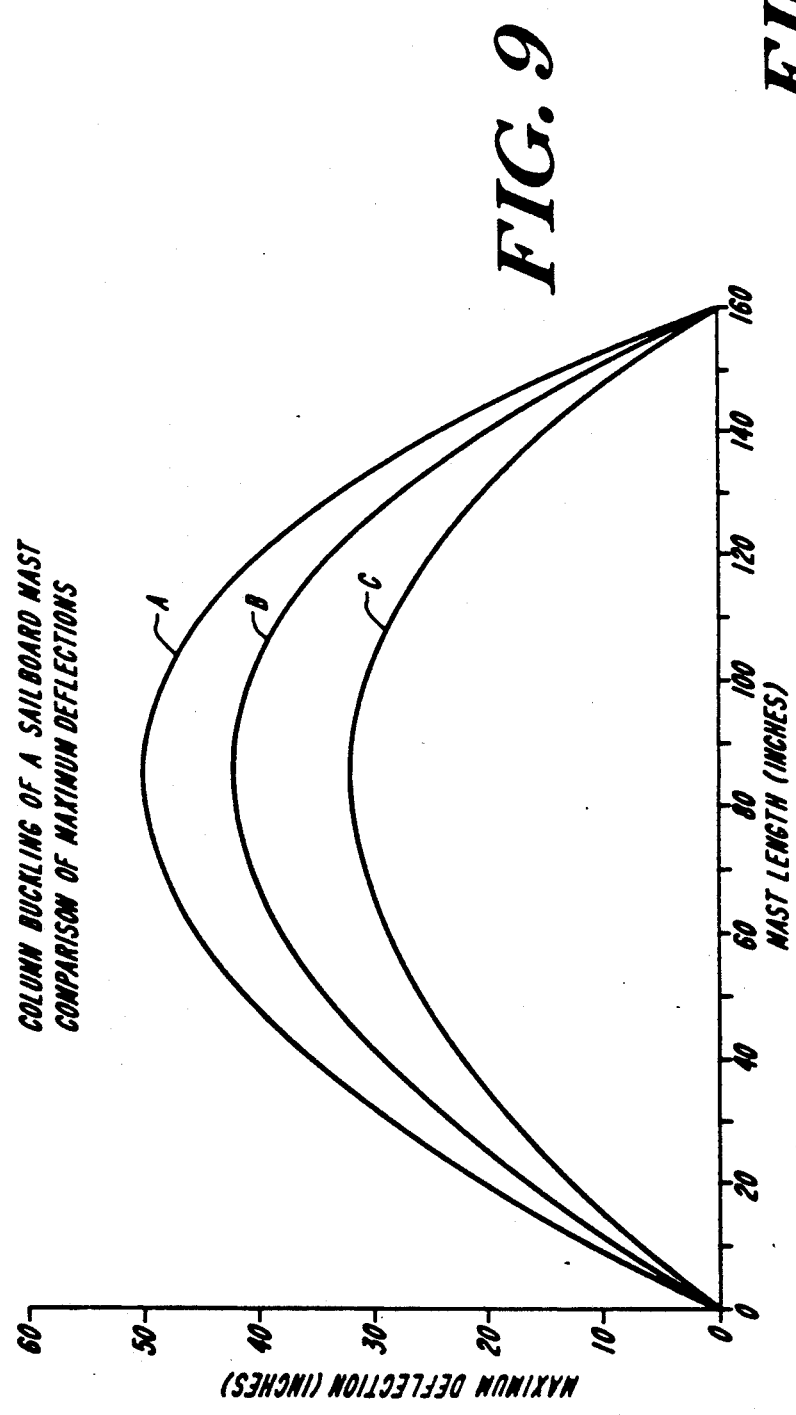
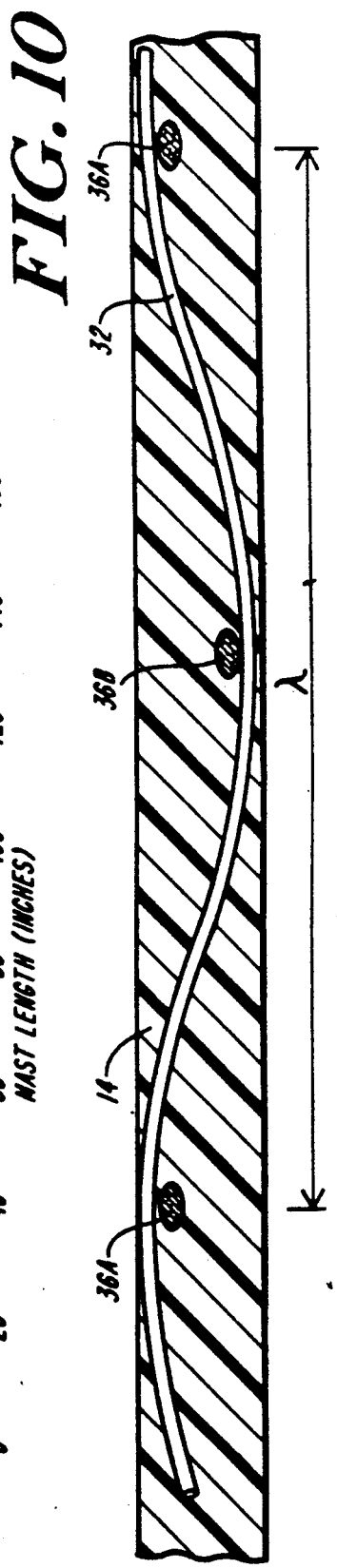

COMPOSITE STRUCTURAL MEMBER WITH HIGH BENDING STRENGTH

REFERENCE TO RELATED APPLICATIONS

This application is a continuation-in-part of U.S. Pat. application Ser. No. 366,464 filed Jun. 14, 1989, now U.S. Pat. No. 5,048,441, for "Composite Structural Member With High Bending Strength and Method of Manufacturing The Same".

BACKGROUND OF THE INVENTION

This invention relates to a composite structural member having a high bending strength. More particularly, the invention is directed to a composite structural member having a unique ply geometry and construction which contributes to a high bending strength.

A number of composite materials are well known in the art and have been used for applications requiring lightweight and high strength. Such materials are constructed of one or more plies, or layers, at least some of which have a fiber component embedded in a polymer matrix. The geometry of the fiber component within each layer contributes to the strength and other properties of the ultimate structure.

Many composite materials are susceptible to structural failure when subjected to excessive bending, compressive or torsional strains. It would be advantageous to provide a lightweight structure able to withstand greater forces.

Accordingly, an object of the present invention is to provide a composite structure having a ply geometry which contributes to improved strength, particularly bending strength. Another object is to provide a lightweight elongate composite structural member having high strength. It is also an object to provide a convenient and efficient method of manufacturing such composite structural members. Other objects of the invention will be apparent to those of ordinary skill in the art upon reading the following disclosure.

SUMMARY OF THE INVENTION

The present invention relates to a composite structural member having improved strength. The composite member is generally elongate and may have various cross-sectional tubular, i.e. hollow, profiles such as circular, rectangular, square and the like. The composite is constructed of a number of plies, each of which has a fiber component disposed within a polymer matrix. The ply geometry of a composite structure that has at least three plies is such that inner and outer plies have continuous, circumferential fibers which are oriented at an angle of between $\pm 30°$ to $\pm 90°$ relative to the longitudinal axis of the composite structural member. There is at least one of each such inner and outer circumferential plies. The circumferential fibers provide crush strength, and reinforce axially-extending fibers against buckling failure. The resistance to crush strength is in part a function of the $\cos^2$ or $\sin^2$ of the foregoing angle between the circumferential fiber orientation and the longitudinal axis of the member.

The composite structure also has at least one intermediate ply having first axially extending fibers in circumferentially spaced sets with circumferential gaps between each set of the first fibers. A set of second axially extending fibers is disposed between each set of first axially extending fibers. These second axial fibers are interwoven with helically oriented braiding fibers, which are disposed at an angle of between $\pm 5°$ and $\pm 60°$ relative to the longitudinal axis of the composite member. Both the first and second axial fibers are oriented substantially parallel, i.e. at an angle of approximately 0° to the longitudinal axis of the member. Preferably, each set of first and second axial fibers comprises two adjacent fibers. The first and second sets of axial fibers cooperate to render the wall thickness throughout the composite substantially uniform.

The circumferential fibers and the braiding fibers may be a variety of fiber materials, including aramid, carbon, graphite and glass, with a modulus greater than ten million psi. The axial fibers may be of fiber materials such as carbon, graphite, ceramic, boron and glass, and with a modulus of at least twelve million psi to withstand bending stresses. The matrix component of the composite, i.e. that portion of the structure excluding the fibers, typically has as its major component a polymer resin and/or ceramic able to penetrate and bond well to the fiber component and able to form secure bonds between the plies. The matrix material, which is selected to be compatible with the manufacture of the composite, preferably is a thermoset material such as epoxy or polyester resin, catalyzed by anhydrides, polyamides or aliphatic amines. In addition, thermoplastic materials such as polyphenylene sulfide, polyethersulfone, polyethylene terephthalate, nylon, polypropylene, polycarbonate, acetal, and polyetheretherketone can be used. The matrix component can also comprise ceramic materials.

BRIEF DESCRIPTION OF THE DRAWINGS

FIG. 7 is a schematic illustration of a sail mast manufactured from a composite member of the present invention.

FIG. 8 is a simplified schematic view of the method of manufacturing composite structural members according to the present invention.

FIG. 9 is a graph of maximum bending deflection as a function of composite length for various composite constructions.

FIG. 10 is a view of the composite section of FIG. 6, rotated 90°, showing one of the braided axial filaments.

DETAILED DESCRIPTION OF THE INVENTION

The composite structural member of the present invention is constructed of a number of plies, each comprising a fiber component disposed in a polymer matrix.

The unique ply geometry of the composite contributes to its improved strength. The composite is generally an elongate member which has a variety of tubular cross sectional shapes, including circular, oval, rectangular, square, polygonal and the like.

A composite member according to the invention can be used as a sail mast or boom, and as an antenna, among many applications requiring light weight and high strength.

Figure 1:
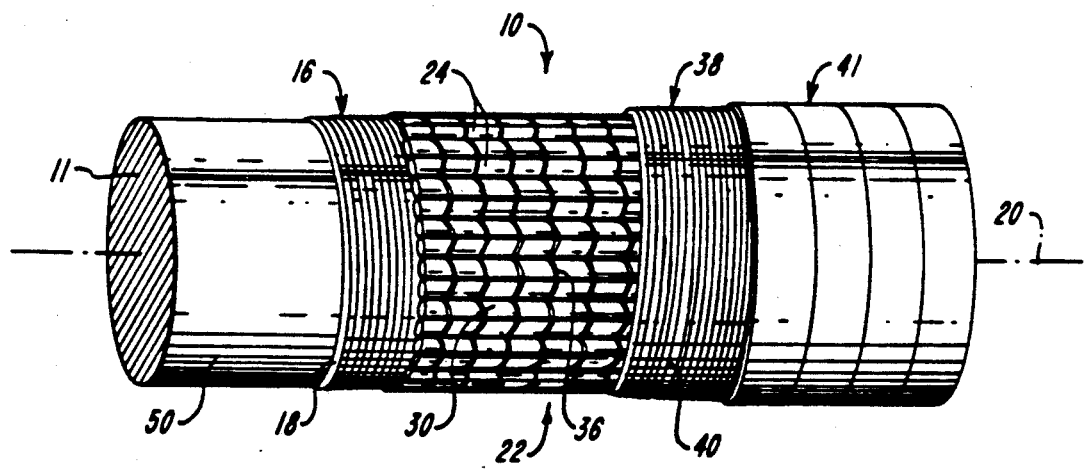
FIG. 1 is a side view, partially broken away, of a composite member, shown as manufactured on a removable mandrel, of the present invention.
Figure 2:
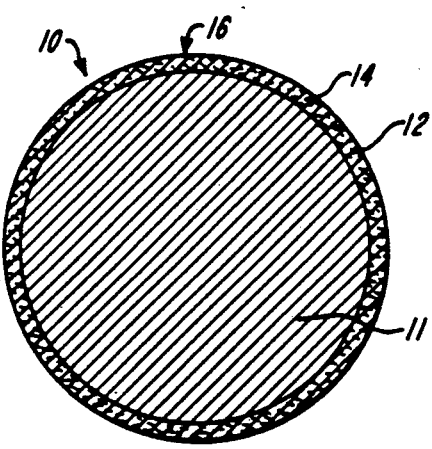
FIG. 2 is a cross sectional view of a partially constructed composite member of the present invention, illustrating the innermost ply of the composite.

FIG. 1 illustrates the geometry of the fiber component of the various plies which form a composite member 10 of the present invention. As shown in FIG. 1, the composite member 10, as manufactured on a removable mandrel, is constructed of a plurality of plies, each of which consists of a fiber component embedded in a polymer matrix. An innermost ply 16, also illustrated in FIGS. 2 through 5, has a fiber component 18 which is circumferentially oriented at an angle of between ±30° and ±90° to the longitudinal axis 20 of the composite member. The circumferential component provides circumferential strength to the composite member, and has maximal circumferential strength at the 90° orientation, with progressively less strength as the angle decreaser. The angle of orientation of fiber component 18 is preferably between ±60° and ±90°, and more preferably between ±80° and ±90° relative longitudinal axis 20. In a preferred embodiment fiber component 18 comprises approximately four to ten continuous, unidirectional strands. In the manufacture of sail board masts, for example, fiber component 18 comprises approximately eight fiber strands. In other embodiments (not shown) fiber component 18 may be braided or woven for increased circumferential stiffness and increased buckling strength.

Fiber component 18 can be manufactured from one of a variety of fibers used in the manufacture of composite structures. Preferably, the yarn of fiber component 18 has a modulus greater than 10 million psi. Examples of suitable fiber materials include aramid, carbon, graphite and glass. For most applications, the preferred material is a glass fiber sold under the trademark E-Glass by Owens-Corning. Preferably, the diameter of the yarn of fiber component 18 is in the range of approximately 0.007 to 0.040 inch. Smaller diameters enhance structural strength, whereas larger diameters are desired to facilitate manufacture.

Generally, innermost ply 16 constitutes the only interior ply having a circumferentially extending fiber component 18. However, where it is desired to achieve stronger, stiffer composite members, more than one ply having circumferentially oriented fibers may be utilized. Where multiple inner plies are used, the circumferential fibers of each preferably are oriented at equal and opposite angles, within the ranges stated above, to the longitudinal axis 20.

Figure 3:
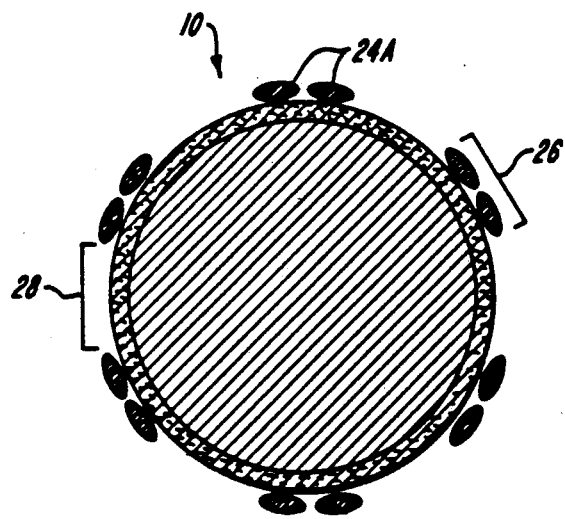
FIG. 3 is a cross sectional view of a partially constructed composite member of the present member, illustrating the innermost ply and the first axial fibers of the intermediate ply.
Figure 4:
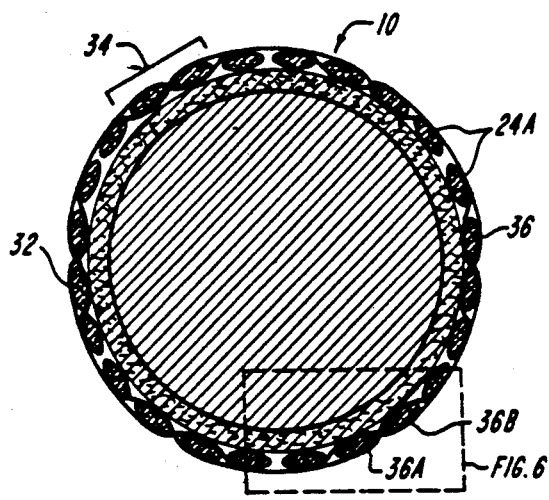
FIG. 4 is a cross sectional view of a partially constructed composite member of the present invention, illustrating the innermost and intermediate plies.

One or more intermediate plies are disposed immediately exterior of the inner circumferential ply 16. FIGS. 1 and 3 through 6 illustrate an embodiment in which a single intermediate ply 22 is present. Intermediate ply 22 features two separate axially extending fiber components 24 and 30. The first axially extending fiber component 24 comprises a plurality of unbraided, continuous fibers 24A which, as shown in FIG. 3, are disposed about the circumference of the composite 10 in sets 26 which are separated by gaps 28. Each individual fiber 24A preferably extends the length of the composite member 10 and is oriented at an angle of about 0° relative to the longitudinal axis 20 of the composite. Typically, each set 26 comprises two individual axial fibers 24A that are positioned immediately circumferentially adjacent each other. Adjacent sets 26 preferably are evenly distributed about the circumference of the composite and separated from each other by a circumferential gap 28. The several gaps 28 in a composite member 10 have uniform width, and this dimension is selected depending upon the desired application. In many applications, a composite structural member according to this invention has a wholly or partly tapered diameter, and in such instances the size of gap 28 changes uniformly throughout the length of the tapered portion.

The second axial fiber component 30 comprises second, axial fibers 32 that are disposed in gaps 28 about the circumference of the composite 10. Like the first axial fibers 24A, the individual second axial fibers 32 are oriented in sets 34 typically comprising two individual fibers 32 in each set. The number of sets 34 present in any given composite may, in some applications, be equal to the number of sets 26. Thus, the periphery of the composite 10 comprises generally alternating sets 26 and 34 of first and second axial fibers 24A and 32, with each fiber of the set being oriented at approximately 0° relative to the longitudinal axis 20 of the composite member 10.

The number of individual first axial fibers 24A which make up any given composite member varies depending on the diameter of the composite and its intended end use. Generally, the number of axial fibers 24A in a given composite is between 5% and 100% of the number of braided axial fibers 32. For most application, however, the preferred number of axial fiber 24A is between 40% and 100% the number of axial fibers 32. In a tapered composite member 10, the numbers of fibers in each component 24 and 30 varies to maintain a uniform ply thickness, or other desired profile of ply thickness, throughout the length of the taper.

Preferably, non-braided sets 26 of axial fibers 24A are separated from each other by a circumferential distance such that, in conjunction with the axial fibers 32, the wall thickness throughout the composite is substantially uniform. For example, to fabricate a two-inch diameter composite tube having forty-eight axial fibers 32, such as BASF G30-500 12K, the preferred spacing would be twenty-four axial fibers 24A (e.g. BASF G30-500 12K fibers) equally spaced in sets of two about the circumference of the composite, with approximately 0.50 inch between sets.

Figure 5:
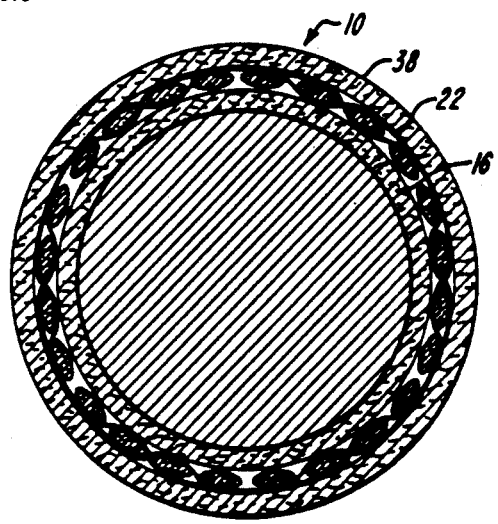
FIG. 5 is a cross sectional view of a composite member of the present invention having inner, intermediate and outer plies.
Figure 6:
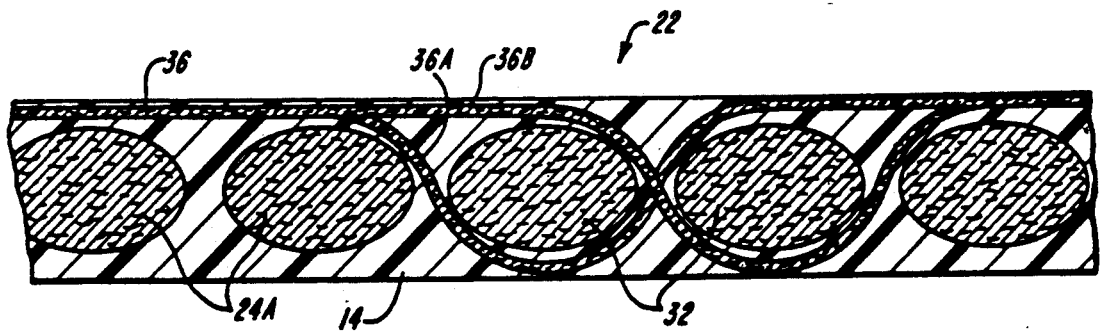
FIG. 6 is a detailed fragmentary, cross-sectional view of the intermediate ply, from a portion of FIG. 4.

With further reference to FIGS. 1 and 4 through 6, the second axial fiber component 30 is engaged with a braiding fiber component 36 which has two helically oriented yarn components 36A, 36B. The yarn components 36A, 36B are interwoven with the individual second axial fibers 32 such that each second axial fiber 32 is sandwiched between braiding yarn components 36A, 36B. The braiding yarn components 36A, 36B are not interwoven with first axial fibers 24A, but rather pass over the top surface of fibers 24A, as shown in FIGS. 6 and 10.

The second axial fibers 32 preferably are essentially straight, and free of crimp, e.g. underlations and deflections due to the braiding with the yarn components 36A and 36B, for maximal strength. The braiding yarns 36A and 36B correspondingly have large radial excursions as each is braided through the ply thickness, around the axial fibers 32.

Each yarn 36A, 36B preferably is continuous, extending the entire length of the composite member 10, although spliced, overlapping and other arrangements of non-continuous braiding yarns can be used. Yarns 36A, 36B are preferably oriented at an angle of between ±5° to ±60° relative to the longitudinal axis 20. The crimp wavelength λ of axial fiber 32, illustrated in FIG. 10, is the distance between two braiding fibers of the same type, e.g., two braiding fibers 36A. The crimp wavelength is generally dependent on the diameter and on the elastic modulus of the second axial fibers 32, as well as on the modulus and the strength of the matrix 14 material. An increase in the optimal crimp wavelength generally increases the amount of strain which for the fibers 32 and the matrix 14 can withstand. Preferably, the crimp wavelength λ is between approximately 0.10 and 1.00 inches.

Preferably, in any given composite structure according to the invention, the first and second axial fibers 24A, and 32 have the same diameter and are of the same materials. The diameter of these axial fibers is in part dependent on the diameter of the composite structure, and preferably ranges between 0.007 and 0.040 inch. The first and second axial fibers 24A and 32 can be of any one of a number of fiber materials including polyethelyne, carbon, graphite, ceramic, boron, aramid and glass. For applications where high strength is required, a preferred material is a carbon or other fiber material having a modulus of at least 34 million psi, a maximum stress of 500 ksi and a 1.4% minimum strain. For most applications, the preferred fiber material is a carbon fiber having approximately 12,000 filaments per yarn, a yield of approximately 615 yd/lb. (0.807 g/m) and a modulus of at least 30 million psi. An example of such a preferred fiber is sold under the trademark Celion Carbon Fiber G30-500 12K by BASF.

The braiding yarn components 36A, 36B preferably have a diameter which is smaller than that of axial fibers 24A and 32, and preferably is at least 25% less than that of the axial fibers 24A and 32. The diameter of braiding yarns 36A and 36B thus is in the range of approximately 0.005 to 0.015 inches. The braiding yarn components 36A and 36B can be of any of a number of fiber materials including aramid, glass, carbon and graphite. A preferred material for braiding yarns 36A and 36B is a glass fiber material sold under the tradmark S-2 Glass by Owens Corning. These fibers preferably have a modulus of at least 10 million psi and a maximum stress of 600 ksi.

For many applications a single intermediate ply 22 may be used in the manufacture of composite structural members according to this invention. However, it is generally preferred to use more than one layer of ply 22. For example, in the manufacture of sailboard masts three layers of ply 22 are typically used. In one highly flexible embodiment of such a member 10 having three intermediate plies 22, the outer two preferably are substantially identical, whereas the innermost one has fewer axial fibers 24A and 32. This arrangement attains high bending and circumferential collapse strength, combined with high axial stiffness.

As shown in FIGS. 1 and 5, an outer ply 38 of fibers is bonded exterior of and immediately adjacent to, i.e. contiguous with, the intermediate ply 22. The outer ply 38 is also set in the polymer resin or other matrix, and has a circumferentially oriented fiber component 40 (FIG. 1). Outer fiber component 40 is preferably oriented at an angle which is the same or similar to that of inner fiber component 18, however, fiber component 40 is wound in a direction opposite to that of fiber component 18. This structure gives the member 10 strength to withstand radial or crushing loading. In a preferred embodiment, the outer fiber component 40 has the same diameter as, and is made of the same fiber material as the fiber component 18. Typically, only a single outer ply need be used, but more than one outer ply can be used if required for a given application.

The tensile modulus of elasticity for ply 16 and for outermost ply 38 each contribute less than 25% per ply to the total axial modulus of elasticity (measured in 0° direction) for the composite. The set of one or more intermediate plies 22 provides the balance.

In applications which involve severe external conditions, such as possible impact from debris or other high speed objects, fiber component 18 is preferably a carbon yarn, such as BASF G40-700, having a modulus of approximately 43.5 million psi and a maximum strain of 1.66%. Fiber component 38 is preferably an aramid fiber, such as DuPont Kevlar HT or Kevlar 29, having a maximum stress of at least 500,000 psi and a tensile modulus of at least 12 million psi. Additional impact strength is attained for such application by braiding, knitting, or weaving the fiber of the external ply.

As noted above, each ply of the present composite member 10 consists of a fiber component disposed in polymer or the matrix 14. The matrix is typically the same for all plies. The material of matrix 14 is compatible with and capable of penetrating and bonding to the several fiber components 18, 24, 30 and 40, in order to provide a strong and reliable composite member. Suitable polymer matrix materials include a number of high strength thermoset or thermoplastic polymers which are well known in composite technology. Examples of preferred thermoset polymers include epoxy, vinyl ester and polyester which may be cured by anhydrides, polyamides, aliphatic amines and other known curing agents. Exemplary thermoplastic polymers include materials such as polyphenylene sulfide, polyethersulfone, polyethylene terephthalate, nylon, polypropylene, acetal, and polyetheretherketone. A specific preferred polymer matrix material is a low viscosity epoxy resin which is cured by an anhydride compound. An example of such a preferred epoxy is sold under the trademark D.E.R. 330 epoxy resin, manufactured by Dow Chemical Company. Preferred anhydride curing agents, i.e. catalysts, for such epoxy resins are methyl tetrahydrophthalic anhydrides.

One particular advantage of the ply structure of the present composite structural member is that the ply geometry of the intermediate ply 22 results in a substantially uniform wall thickness throughout the composite 10. The first axial fiber component 24 fiber and thereby effectively eliminates gaps that develop between the sets 34 of the second axial fibers 32. Such gaps, if they did exist, would result in surface and thickness irregularities that would tend to decrease the bending, torsional, and radial strength of the composite. FIG. 9 is a graph which plots maximum deflection against composite length both for a composite manufactured according to the present invention and for other constructions. Curve A represents the bending strength of a composite manufactured according to the present invention and clearly illustrates the increased bending strength achieved by the present constructions. Curve B represents the bending strength of a similar composite constructed without first axial fiber component 24. Curve C depicts the bending strength of a composite similar to that shown in curve A, except that it was constructed without circumferential fiber components 18 and 38, and without axial fiber component 24.

As a result of a more uniform wall thickness, composites manufactured according to the present invention have an increased bending strength. Moreover, the interlaminar bonding of the plies is improved due to the Z-direction component, i.e. in the radial, thickness direction, of the braiding fibers component 36 which contributes to the improved strengths of these composites. Stresses in the matrix are also reduced, in comparison to other braided or woven composite structures, by reduced crimp in the high modulus axial fibers. The increased bending strength of these composite members is achieved without any significant increase in weight. Consequently, the combination of high strength and light weight of such composites renders them useful for a variety of applications.

These composites are particularly well suited for articles which must withstand bending strains, as defined by change in overall length divided by original length and as typically measured with strain gager, greater than 0.25%. Accordingly, these composite structural members find use in many recreational applications including the manufacture of ski poles, yacht spars, golf club shafts, pole vault poles, fishing rods, fishing outriggers, oar shafts, paddle shafts, hockey stick shafts, baseball bats, glider structures and many other applications where light weight and high strength, particularly high bending strength are desirable. Such composite materials may also find use in structural tubing and piping. In addition, these materials may be used in the manufacture of aircraft and aerospace structures, structural members for automobiles, tubular housings, torsional and leaf springs and robotics. These materials may also be used in the manufacture of housings for communication antennas and marine superstructures as well as for medical accessories such as wheelchairs, canes, stretchers and prosthetics. One preferred application of these composites is as mast structures for sailboats and sail boards.

FIG. 7 illustrates a spar 42 which can be used to fabricate a sail mast, such as a sailboard mast, and which is manufactured using the technology described above. The spar 42 comprises an upright tubular post 44 which is used to support a sail (not shown). The illustrated spar 42 is a composite of the type described above, having a single inner ply, three intermediate plies and an outer ply. The diameter of post 44 is constant throughout about one-half of the length of the spar, and is uniformly tapered down throughout the remaining length of the spar. Preferably, the diameter in the tapered portion of the spar ranges from approximately 2.0 to 0.85 inches. In addition to the plies and matrix which constitute post 44, the spar 42 also may have an outer, environmentally protective coating, e.g. of polyurethane. The coating can include UV absorbing additives to protect the matrix material from degrading upon exposure to sunlight.

In order to resist excessive localized bending forces, such as those which result from the presence of a boom (not shown), the illustrated spar 42 has a reinforced medial boom region 46. As shown in FIG. 7, the post 44 is reinforced over a length of approximately forty inches to accommodate a variety of boom positions and sail designs. The reinforced boom region 46 preferably comprises an external wrap of about 8.75 ounce per yd² of a woven glass fabric (e.g., E-Glass) which is saturated with resin and which is bonded to the spar with compacting tape. The reinforced region 46 typically adds an additional 0.015 inches to the wall thickness of the composite. Without reinforcement, the wall thickness in the boom region 46 is approximately 0.065 inch. The effect of the reinforced boom region is to increase the circumferential stiffness of the spar so that it can better withstand the point loading which is caused by the attachment of a boom to the spar. The woven reinforcing fabric of region 46 is also able to better withstand and distribute point loading than a layer of non-interlaced fibers of the same types and ply thickness. Although illustrated in FIG. 7, and useful for some applications, a reinforced boom region 46 is not necessary for all sail masts manufactured from a composite according to the present invention.

FIG. 8 illustrates a composite assembly apparatus 49 for the manufacture of a composite structure according to this invention. The various plies which make up the composite structural members of this invention are wrapped around a mandrel or form 50, the general shape of which is assumed by the composite. Mandrels 50 which are useful in the manufacturing process of this invention can be tapered or nontapered, and the mandrel can be fabricated from such materials as aluminum, steel, plastic, rubber or other suitable materials. Although the mandrel can be either hollow or solid, a hollow mandrel is preferred.

As shown in FIG. 8, a mandrel 50 is positioned within a composite manufacturing line to traverse through a series of stations which apply and wrap various fibers and polymer matrix layers about the mandrel 50. The mandrel 50 initially encounters a station 52 that applies the fibers 18 of the inner ply 16. Station 52 may consist of an apparatus holding multiple packages 54 of fiber (e.g., four to eight packages) which rotate about an axis parallel to the direction of the traverse 56 of the mandrel 50. The speed of the rotation (rpm) of the fiber package 54 of station 52, relative to the rate of the mandrel 50 traverse, determines the amount and orientation of the fibers in inner ply 16. For example, in the manufacture of a sailboard mast, the mandrel 50 traverses the assembly apparatus 49 at a speed of about four ft. per minute, while the eight yarn packages of station 52 rotate at a varying speed of between 40 and 175 rpm, depending upon specific design requirements and the diameter of the composite at a given region. Immediately following station 52, a liquid polymer resin, such as epoxy, is applied through an apparatus 58A which immerses and saturates the entire inner fiber component 18. The ratio by volume of resin to fiber is preferably about 1:1 or less.

As the mandrel 50 continues to traverse the manufacture apparatus 49, it next encounters filament wrapping station 60, which applies a fiber component of a first intermediate ply. Yarn packages 62A apply a first axial fiber 24 while yarn packages 62B apply a second axial fiber 32. Braiding yarn components 36A and 36B are applied at station 60 through a braiding apparatus (not shown). The number of yarn packages 62A and 62B preferably corresponds to the number of axial fibers 24, 32 present in each ply. Resin applicator 58B also forms part of station 60, as it applies additional resin to form the matrix of the first intermediate ply.

Filament wrapping stations 61 and 64 apply second and third intermediate plies, respectively, in a manner similar to that described above. Resin applicators 58C and 58D cooperate with stations 61 and 64 to add additional matrix-forming polymer resin.

The mandrel 50 is next passed through filament wrapping station 66 which is identical to station 52. Station 52 applies the fiber component of the outer ply 38 in the same manner as station 52, except that station 66 rotates in a direction opposite to that of station 52. Following the application of this circumferential layer, additional resin material is applied to the composite by apparatus 58E. If desired, additional stations (not shown) may apply additional circumferential layers which will subsequently be coated with resin.

In each filament wrapping station, the fiber tension is controlled such that the fibers remain taut, without looseness or displacement of the fibers after application. The tension of the braiding fibers 36 is controlled by a braiding machine apparatus which maintains a tension of about 1 lb. or less per fiber.

Finally, the mandrel 50 is passed through a tape winding device 68 which applies thermoplastic tape 41, e.g., having a width of about one-half to three-quarter inch, about the mandrel 50 and its plies. The tape tension is preferably kept at between three and fifteen pounds. The tension in the tape compacts the filament wound about the mandrel and the resin, and forces out excess resin and most of the air which is trapped between the filaments and the resin. An example of a type of tape which is especially useful in the manufacture of sailboard masts is one-half inch wide silicon coated polyester film having a thickness of two mils.

A drive mechanism 70 is typically utilized to advance the mandrel 50 along the manufacture apparatus 49. Preferably this mechanism is capable of varying the rate at which mandrel 50 traverses.

After the application of the thermoplastic tape, the entire structure is placed in a vertical convection oven at approximately 300° F. for about two hours to cure the resin. The structure is removed from the oven and allowed to cool. Following this step, the mandrel 50 is extracted from the cured composite. Extraction of the mandrel may require in excess of 1000 lbs. of pull due to the shrinkage of the composite when the resin changes from liquid to solid form. Following this step, the thermoplastic compaction tape 41 is removed from the laminate, typically by a simple unwinding process.

Following the removal of the tape, the composite can be processed in a sanding apparatus which removes glass from cured resin and makes uniform the outside diameter of the composite to prepare it for polyurethane coating. These sanding steps are particularly applicable in the manufacturing of sail board masts.

The structure and manufacturing process of the invention are further described with reference to the following non-limiting examples.

EXAMPLE I

In this example, a sailboard mast having the structure discussed above, an overall length of 460 centimeters, outer diameter that tapers from 5.3 to 3.0 centimeters, wall thicknesses ranging between 0.18 centimeters and 0.24 centimeters, and 5 plies is described.

The following materials are used to manufacture the mast of this example.

| Component (Ref. No.): | Inner-Ply Circumferential Fiber (18) |
|---|---|
| Material: | E-Glass |
| Type: | 675 Type 30 Roving |
| Supplier: | Owens-Corning |
| Properties: | Modulus = $10.5 \times 10^6$ psi |
| | Density = 2.5 g/cm$^3$ |
| Component (Ref. No.): | Axial Fiber (24A) |
| Material: | Carbon Fiber |
| Type: | 12k G30500 |
| Supplier: | BASF |
| Properties: | Modulus = 34 MSI |
| | Density = 1.77 g/cm$^3$ |
| Component (Ref. No.): | Axial Fiber (32) |
| Material: | Carbon Fiber |
| Type: | 12k G30500 |
| Supplier: | BASF |
| Properties: | Modulus = 34 MSI |
| | Density = 1.77 g/cm$^3$ |
| Component (Ref. No.): | Braiding Yarn (36A) |
| Material: | S2-Glass |
| Type: | S2CG1501/3 |
| Supplier: | Owens-Corning |
| Properties: | Modulus = 12.0 MSI |
| | Density = 2.48 g/cm$^3$ |
| Component (Ref. No.): | Braiding Yarn (36B) |
| Material: | S2-Glass |
| Type: | S2CG1501/3 |
| Supplier: | Owens-Corning |
| Properties: | Modulus = 12.0 MSI |
| | Density = 2.48 g/cm$^3$ |
| Component (Ref. No.): | Circumferential Fiber (40) |
| Material: | E-Glass |
| Type: | 675 Type 30 Roving |
| Supplier: | Owens-Corning |
| Properties: | Modulus = $10.5 \times 10^6$ psi |
| | Density = 2.50 g/cm$^3$ |
| Component (Ref. No.): | Matrix Material (14) |
| Material: | Epoxy Resin, Methyl tetrahydrophthalic anlydride, N, N Dimethyl Benzylamine (100:80:2 parts by weight respectively) |
| Type: | DER 330, AC-75 |
| Supplier: | Dow Chemical Company |

To fabricate the mast of this example, a mandrel is passed through the machinery described in FIG. 8 at rate of 4 feet per minute. The mandrel is formed from anodized aluminum and has 6 tapers as delineated in Table I below.

TABLE I

| Mandrel OD (inches) | Length of Taper (inches) |
|---|---|
| 1.913 | 30 |
| 1.909 | 12.0 |
| 1.859 | 36 |
| 1.809 | 91 |
| 1.141 | 12 |
| 1.020 | 12 |

At station 58A, the liquid epoxy resin and catalyst mix as described above, is applied to the mandrel at the position where the inner-ply circumferential fiber component 18 is wrapped about the mandrel. The fiber 18 is wrapped about the mandrel at a variable rate to provide the necessary circumferential stiffness and crush strength. The amount of fiber 18 is varied to change circumferential stiffness as the diameter and design loading requirements for the structure change. Next, fiber winding apparatus 15 is loaded with eight dispensing packages, and the machine rotated about the mandrel. Table II below illustrates the changes in the amount in of fiber 18 wrapped about the mandrel during the winding process.

TABLE II

| Position | Fiber 18 Amount (lbs/ins in Axial Direction) | Machine RPM |
|---|---|---|
| Base | 0.0040 | 96 |
| ↓ | 0.0039 | 96 |
| ↓ | 0.0036 | 90 |
| ↓ | 0.0033 | 84 |
| ↓ | 0.0022 | 60 |
| ↓ | 0.0016 | 48 |
| ↓ | 0.0012 | 42 |
| ↓ | 0.0011 | 42 |
| Tip | 0.0009 | 42 |

As the mandrel traverses braider 60, the following fiber components are applied: 12 yarns of fiber 32 equally spaced about the braiding machine, 24 ends of fibers 36A rotating on the braiding apparatus in a clockwise fashion, and 24 ends of fibers 36B rotating on the braiding apparatus in a counter-clockwise fashion. The fibers 36A and 36B are rotated at 3.85 rpm.

In the next step, liquid epoxy resin is liberally applied to the fibers as they are braided about the mandrel at station 58D.

As the mandrel tranverses braider 61, the following components are applied: 24 yarns of fibers 24A spaced in pairs equally about the mandrel, 48 yarns of fibers 32 equally spaced about the braiding machine, 24 ends of fibers 36A rotating on the braiding apparatus in a clockwise fashion, and 24 ends of fibers 36B rotating on the braiding apparatus in the counter-clockwise fashion. The fibers 36A and 36B are rotated on the binding apparatus at a fixed rate of 3.85 rpm.

Liquid epoxy resin is then again applied liberally to the fibers as they are braided about the mandrel at station 58C.

The mandrel then traverses through braider 64. At this point the following fibers are applied: 24 yarns of fibers 24A spaced in pairs equally about the mandrel, 48 yarns of fibers 32 equally spaced about the braiding machine, 24 ends of fibers 36A rotating on a braiding apparatus in a clockwise fashion, and 24 ends of fibers 36B rotating on the braiding apparatus in the counter-clockwise fashion. The rate of rotation of the apparatus holding fibers 36A and 36B is 3.85 rpm.

Next, liquid epoxy resin was is liberally applied to the fibers as they are braided about the mandrel at station 58D.

The fiber component 40 is then wrapped about the mandrel at a variable rate to provide the necessary circumferential stiffness and crush strength. The amount of fiber 18 is varied to change circumferential stiffness as the diameter, and the design loading on the structure, changes. To accomplish this step, fiber winding apparatus 66 is loaded with eight dispensing packages, and the machinery rotated about the mandrel as the mandrel traversed through the process. The following Table III illustrates the changes in the amount of fiber 18 which was bound around the mandrel during this step.

TABLE III

| Position | Fiber 40 Amount (lbs/ins in Axial Direction) | Machine RPM |
|---|---|---|
| Base | 0.0051 | 120 |
| ↓ | 0.0050 | 120 |
| ↓ | 0.0062 | 150 |
| ↓ | 0.0061 | 150 |
| ↓ | 0.0048 | 120 |

TABLE III-continued

| Position | Fiber 40 Amount (lbs/ins in Axial Direction) | Machine RPM |
|---|---|---|
| ↓ | 0.0033 | 96 |
| ↓ | 0.0022 | 72 |
| ↓ | 0.0016 | 60 |
| Tip | 0.0014 | 60 |

At station 58E, the liquid epoxy resin and catalyst mix is again applied to the mandrel and fibers at the position where the fiber component 18 is wound onto the mandrel.

The mandrel and fiber plies having uncured liquid epoxy thereon, then pass through tape compacting machine 68. Two rolls of ½ inch wide cellophane tape sold by Century Design, Inc., San Diego, Calif. are rotated about the mandrel at a rate of 60 rpm.

The mandrel and uncured plies are then disengaged from the tranverse apparatus 70, and suspended vertically in a convection hot air oven. The structure is then cured at 140° C. for 8 hours.

Upon completion of curing, the mandrel is removed from the structure using mandrel extraction techniques familiar to those skilled in the art. Next, the cellophane tape is unwound as described above.

To perform the finishing process, the mast is then cut to a length of 4.6 meters (1 inch is trimmed from the bottom of the structure and the remaining excess length trimmed from the top). The structure is then sanded with 80 grit finish sandpaper using a centerless wet sanding machine. After sanding, a 40 inch long by 14 inch wide layer of 8.75 oz/yd$^2$ E-Glass fiberglass plain weave cloth is impregnated with the epoxy resin and catalyst and wrapped around the composite structure. The cloth covers the mast from a distance of 30 inches from the base to 70 inches from the base. A tape is then spiral wrapped around the reinforcing fiberglass, and the complete structure cured once again at 140° C.

After curing, the tape is removed and the structure re-sanded.

In the final step, the structure is coated with a clear polyurethane coating mixed with 2% by weight iron oxide pigment.

The resulting structure has the following properties:

TABLE IV

| | |
|---|---|
| The final mast weight = | 3.90 lbs. |
| The center of gravity = | 42% from base |
| The crushing strength = | 445 lbs. (2 inch section from base) |
| The load and maximum deflection in a column buckling test = | 330 lbs., 40 inches |
| At base of the Mast | |
| Material Modulus (0 Deg) = | 10.2 Msi |
| Modulus (90.0 Deg) = | 3.0 Msi |
| Modulus (45 Deg) = | 5.69 Msi |
| Density = | 1.84 g/cm$^3$ |

EXAMPLE II

In this example, a sailboard mast having the structure and manufacture delineated above and an overall length of 480 centimeters, and outer diameter that tapers from 5.3 to 3.0 centimeters, wall thicknesses ranging between 0.18 centimeters and 0.24 centimeters, and 6 plies is discribed.

The following materials were used to manufacture the structure of this example.

TABLE II

| Component (Ref. No.): | Inner-Ply Circumferential Fiber (18) | |
|---|---|---|
| Material: | E-Glass | |
| Type: | 675 Type 30 Roving | |
| Supplier: | Owens-Corning | |
| Properties: | Modulus = 10.5 × 10⁶ psi Density = 2.50 g/cm³ | |
| Component (Ref. No.): Axial Fiber (24A) (In this example fiber 24A is a combination of two separate fibers) | | |
| Materials: | Carbon Fiber | E-Glass |
| Types: | 12k G30500 | 450 Type 30 Roving |
| Suppliers: | BASF | Owens Corning |
| Properties: | Modulus = 34 MSI Density = 1.77 g/cm³ | 10.5 2/5 g/cm³ |
| Component (Ref. No.): Axial Fiber (32) (In this example the fiber 32 is a combination of two separate fibers) | | |
| Material: | Carbon Fiber | E-Glass |
| Type: | 12k G30500 | 450 Type 30 Roving |
| Supplier: | BASF | Owens Corning |
| Properties: | Modulus = 34 MSI Density = 1.77 g/cm³ | 10.5 Msi 2.5 g/cm³ |
| Component (Ref. No.): | Braiding Yarn (36A) | |
| Material: | S2-Glass | |
| Type: | S2CG1501/3 | |
| Supplier: | Owens-Corning | |
| Properties: | Modulus = 12.0 MSI Density = 2.48 g/cm³ | |
| Component (Ref. No.): | Braiding Yarn (36B) | |
| Material: | S2-Glass | |
| Type: | S2CG1501/3 | |
| Supplier: | Owens-Corning | |
| Properties: | Modulus = 12.0 MSI Density = 2.48 g/cm³ | |
| Component (Ref. No.): | Circumferential Fiber (40) | |
| Material: | E-Glass | |
| Type: | 675 Type 30 Roving | |
| Supplier: | Owens-Corning | |
| Properties: | Modulus = 10.5 × 10⁶ psi Density = 2.50 g/cm³ | |
| Component (Ref. No.): | Matrix Material (14) | |
| Material: | Epoxy Resin, Methyl tetrahydrophthalic anlydride, N, N Dimethyl Benzylamine (100:80:2 parts by weight respectively) | |
| Type: | DER 330, AC-75 | |
| Supplier: | Dow Chemical Company | |

This example outlines the procedure for the design and manufacture of sailboard mast which utilizes a combination of two fiber materials for each of fibers 24A and 32 so as to achieve improved impact resistance and overall bending strength in comparison to the material described in Example I above.

In this example 6 plies rather than 5, as in Example 1, are used.

The mandrel is manufactured from teflon anodized aluminum and has six tapers to achieve the desired stiffness distribution and meet outer diameter requirements. The mandrel has the following tapers as the stated points along its length:

TABLE V

| Mandrel OD (inches) | Length of Taper (inches) |
|---|---|
| 1.913 | 26.0 |
| 1.909 | 68.0 |
| 1.863 | 14.0 |
| 1.713 | 65.0 |
| 1.250 | 18.0 |

TABLE V-continued

| Mandrel OD (inches) | Length of Taper (inches) |
|---|---|
| 1.020 | 17.0 |

To fabricate the sailboard mast, the mandrel is passed through machinery as in FIG. 8.

The mandrel 50 is pulled through the braiding machines at a rate of 4 feet per minute.

At station 58A, the liquid epoxy resin and catalyst mix is applied to the mandrel at the position where the fiber component 18 is wrapped about the mandrel.

Fiber component 18 is wrapped about mandrel at a variable rate to provide necessary circumferential stiffness and crush strength. The amount of fiber 18 is varied to maintain the necessary circumferential stiffness as the diameter changes and as the design loading on the structure changes. The fiber winding apparatus 52 is loaded with eight dispensing packages, and the machinery rotates about the mandrel as the mandrel traverses through the machinery. The following chart illustrates the changes in the amount of fiber 18 wrapped about the mandrel.

TABLE VI

| Position | Fiber 18 Amount (lbs/ins in Axial Direction) | Machine RPM |
|---|---|---|
| Base | 0.0049 | 120 |
| ⅛ | 0.0049 | 120 |
| ¼ | 0.0061 | 150 |
| ⅜ | 0.0061 | 150 |
| ½ | 0.0053 | 132 |
| ⅝ | 0.0040 | 108 |
| 6/8 | 0.0032 | 96 |
| ⅞ | 0.0025 | 84 |
| Tip | 0.0019 | 72 |

The mandrel is then passed through four braiding stations which have identical yarn components and fiber geometries. The braider 61 of FIG. 8 is given in detail below, identical settings are used for braiders 60, 62, 63.

The liquid matrix material is liberally applied to the fiber as they are being braided about the mandrel at station 58C.

As the mandrel traverses through braider 61, the following fiber components are applied: 18 yarns of 450 Type 30 E-glass roving and 6 yarns of 12 k G30500 carbon fiber constituting a total of 24 yarns of fiber 24A spaced in pairs equally about the mandrel, 36 yarns of 450 Type 30 E-glass roving and 12 yarns of 12 k G30500 carbon fiber constituting a total of 48 yarns of fiber 32 equally spaced about the braiding machine, 24 ends of fiber 36A rotating on the braiding apparatus in a clockwise fashion, and 24 ends of 36B rotating on the braiding apparatus in a counter-clockwise fashion. The revolutions per minute of the 36A and 36B yarn is fixed at 3.85 revolutions per minute.

The liquid matrix material is liberally applied to the fibers as they are being braided about the mandrel at station 58D.

The fiber component 40 is wrapped about mandrel at a variable rate to provide necessary circumferential stiffness and crush strength. The amount of fiber 18 is varied to change circumferential stiffness as the diameter changes and as the design loading on the structure changes. The fiber winding apparatus 66 is loaded with eight dispensing packages, and the machinery rotates about the mandrel, as the mandrel is traversed through the process. The following chart illustrates the changes in the amount of fiber 18 wrapped about the mandrel.

TABLE VII

| Position | Fiber 40 Amount (lbs/ins in Axial Direction) | Machine RPM |
|---|---|---|
| Base | 0.0059 | 132 |
| ⅛ | 0.0059 | 132 |
| ⅛ | 0.0069 | 156 |
| ⅜ | 0.0069 | 156 |
| ⅜ | 0.0052 | 120 |
| ⅝ | 0.0044 | 108 |
| 6/8 | 0.0035 | 96 |
| ⅞ | 0.0032 | 96 |
| Tip | 0.0029 | 96 |

At station 58E, the liquid epoxy resin and catalyst mix is applied to the mandrel at the position where the fiber component 18 is wrapped about the mandrel.

The mandrel and fiber plies with uncured liquid epoxy then pass through tape compacting machine 68. Two rolls of ½ wide cellophane tape sold by Century Design, Inc., San Diego, Calif. are then rotated about the mandrel at a rate of 60 rpm.

The mandrel and uncured plies are then disengaged from the traverse apparatus 70, and the structure is suspended vertically in a convection hot air oven. The structure is then cured at 140° C. for 8 hours.

Next, the mandrel is removed from the structure using a mandrel extraction machine and the tape unwound as per the general description.

The resulting mast is then cut to a 480 centimeter length (1 inch being trimmed from the bottom, and the remaining excess length trimmed from the tip).

The mast is then sanded with 80 grit finish with a centerless wet sanding machine. After sanding the mast is coated with a clear polyurethane coating mixed with 2% weight black iron oxide pigment.

The resulting structure has the following properties:

| | |
|---|---|
| The final mast weight = | 5.4 lbs. |
| The center of gravity = | 45% (from the base of the structure) |
| The crushing strength = | 550 lbs. (2 inch section from base) |
| The load and maximum deflection in a column buckling test = | 330 lbs., 48 inches |
| At base of the Mast | |
| Material Modulus (0°) = | 6.1 Msi |
| Modulus (90.0°) = | 2.3 Msi |
| Modulus (45°) = | 4.1 Msi |
| Density of Laminate = | 2.05 g/cm$^3$ |

EXAMPLE III

Curved Structural Member, Sailboard boom

The following example illustrates a method of manufacture, and the design for, a circular tube having a curved section.

The dimensions of the tube produced by the method of this Example are:
Tube length: 180 cm
Tube inner diameter: 2.67 cm
Tube has three integral sections:
(1) a straight section = 42 inches long
(2) a curved section with radius of 16 inches, thru an angle of 41°; and
(3) a straight section = 12 inches The materials used are the same as in Example I.

The mandrel used in this Example is manufactured from 80 Durometer silicone rubber cord and has a constant outer diameter of 1.05 inches.

To fabricate a curved tube such as a sailboard boom, the mandrel is passed through machinery similar to FIG. 8, however, only two braiding machines 61 and 64 are used.

The mandrel 50 is then pulled through the braiding machines at a rate of 4 feet per minute.

At station 58A, the liquid expoxy resin and catalyst mix is applied to the madrel were the fiber component 18 is wrapped about the mandrel.

The fiber component 18 is wrapped about mandrel at the rate of 50 rpm, clockwise. The fiber winding apparatus 52 is loaded with eight dispensing packages, and the machinmery rotates about the mandrel as the mandrel traverses through the machinery.

As the mandrel traverses braider 61, the following fiber components are applied: 24 yarns of fiber 24A spaced in pairs equally about the mandrel, 48 yarns of fiber 32 equally spaced about the braiding machine, 24 ends of fibers 36A rotating on the braiding apparatus in a clockwise fashion, and 24 ends of fibers 36B rotating on the braiding apparatus in a counter-clockwise fashion. The revolutions per minute of the 36A and 36B yarn is fixed at 3.85 rpm.

Liquid matrix material is liberally applied to the fibers as they are being braided about the mandrel at station 58C.

The mandrel then traverses through braider 64. The following fiber components are applied: 24 yarns of fiber 24A spaced in pairs equally about the mandrel, 48 yarns of fiber 32 equally spaced about the braiding machine, 24 ends yarn 36A rotating on the braiding apparatus in a clockwise fashion, and 24 ends of yarn 36B rotating on the braiding apparatus in a clockwise fashion. The revolutions per minute of the 36A and 36B yarn is fixed at 3.85 rpm.

Liquid matrix material is liberally applied to the fibers as they are being braided about the mandrel at station 58D.

next, the fiber component 40 is wrapped about the mandrel at the rate of 50 rpm, in a counter-clockwise direction.

At station 58E, the liquid expoxy resin and catalyst mix is again applied to the mandrel at the position where the fiber component 18 is wrapped about the mandrel.

The mandrel and fiber plies, with uncured liquid expoxy thereon, then pass thru tape compacting machine 68. Two rolls of ½ wide cellophane tape sold by Century Design, Inc. San Diego, Calif. are rotated about the mandrel at a rate of 60 rpm.

The mandrel and uncured plies are then disengaged from the traverse apparatus 70, and are clamped into a jig or form which will create correct geometry of the curved sections. The jig is then placed in a hot air convection oven, and the parts are cured for 8 hours at 140 degrees Celcius.

Next, the silicone mandrel is removed from the part with a mandrel extraction machine familiar to those skilled in the art. The tape is then unwound in accordance with the above description.

The resulting structure has the following properties:

The final tube weight = 1.21 lbs.
Material Modulus (0 Deg.) = 12.2 Msi
Modulus (90.0 Deg) = 2.4 Msi
Modulus (45 Deg.) = 5.9 Msi
Density of Laminate = 1.5 g/cm³

EXAMPLE IV

The following structure is an example of a composite member which is designed to resist combined bending and torsional loading.

The final composite structure has the following dimensions:
Length: 365 cm
Outer diameter: 3.1 cm
Wall thickness: 0.3 cm
Number of plies: 6

The materials used are in accordance with those outlined above in connection with Example I.

The general manufacturing apparatus is as shown in FIG. 8 with the following additions and modifications: there are four braiding machines instead of the three shown, and two of the braiding machines and yarn packages, except braider 61, and packages 62B, 62A, have the ability to rotate about the axis 100 upto 56 degrees.

The description of the manufacturing referring to FIG. 8 proceeds as described below.

The mandrel is manufactured from teflon anodized aluminum having a constant 1.00 inch diameter.

The mandrel 50 is pulled through the braiding machines at a rate of 2 feet per minute.

At station 58A, the liquid expoxy resin and catalyst mix is applied to the mandrel at the position where the fiber component 18 is wrapped about the mandrel.

Fiber component 18 is wrapped about mandrel in a counter-clockwise direction at 7.5 rpm. Fiber winding apparatus 52 is loaded with sixteen dispensing packages, and the machinery rotates about the mandrel, as the mandrel traverses through the machinery.

As the mandrel traverses through braider 60, the following fiber components are applied: 24 yarns of fiber 24A spaced in pairs equally about the mandrel, 48 yarns of fiber 32 equally spaced about the braiding machine. 24 ends yarn 36A rotating on the braiding apparatus in a clockwise fashion, and 24 ends of yarn 36B rotating on the braiding apparatus in a counter-clockwise fashion. The revolutions per minute of the 36A and 36B yarns is fixed at 1.9 rpm.

The liquid matrix material is liberally applied to the fibers as they are being braided about the mandrel at station 58B.

As the mandrel traverses through braider 61, the following fiber components are applied: 24 yarns of fiber 24A spaced in pairs equally about the mandrel, 48 yarns of fiber 32 equally spaced about the braiding machine, 24 ends yarn 36A rotating on the braiding apparatus in a clockwise fashion, and 24 ends of yarn 36B rotating on the braiding apparatus in a counter-clockwise fashion. The revolutions per minute of the 36A and 36B yarns is fixed at 1.9 rpm. In addition, the complete braiding apparatus is rotating at 7.5 rpms in a clockwise direction.

The liquid matrix material is liberally applied to the fibers as they are being braided about the mandrel at station 58C.

As the mandrel traverses through a second braider 61, the following fiber components are again applied: 24 yarns of fiber 24A spaced in pairs equally about the mandrel, 48 yarns of fiber 32 equally spaced about the braiding machine, 24 ends yarn 36A rotating on the braiding apparatus in a clockwise fashion, and 24 ends of yarn 36B rotating on the braiding apparatus in a counter-clockwise fashion. The revolutions per minute of the 36A and 36B yarns is fixed at 1.9 rpm.

The liquid matrix material is again liberally applied to the fibers as they are being braided about the mandrel at a second station 58C.

The mandrel then traverses through braider 64. The following fiber components are applied: 24 yarns of fiber 24A spaced in pairs equally about the mandrel, 48 yarns of fiber 32 equally spaced about the braiding machine, 24 ends yarn 36A rotating on the braiding apparatus in a clockwise fashion, and 24 ends of yarn 36B rotating on the braiding apparatus in a counter-clockwise fashion. The revolutions per minute of the apparatus holding the 36A and 36B yarn is fixed at 1.9 rpm. In addition, the complete braiding apparatus is rotating at 7.5 rpm in a counter-clockwise direction.

There is an additional braiding apparatus, not shown in FIG. 8., which is identical to that which is described above for braider 60.

The liquid matrix material resin is liberally applied to the fibers as they are being braided about the mandrel at station 58D.

The fiber component 40 is wrapped about mandrel in a clockwise direction at 1.9 rpm.

At station 58E, the liquid expoxy resin and catalyst mix is applied to the mandrel at the position where the fiber component 18 is wrapped about the mandrel.

The mandrel and fiber plies with uncured liquid expoxy then pass through tape compacting machine 68. Two rolls of ½ wide cellophane tape sold by Century Design, Inc. San Diego, Calif. are rotated about the mandrel at a rate of 30 rpm.

The mandrel and uncured plies are then disengaged from the traverse apparatus 70, and the assembly is suspended vertically in a convection hot air oven. The tube is then cured at 140 Deg. C. for 8 hours.

The mandrel is then removed from the part with a mandrel extraction machine.

The tape is then unwound as per the preceeding general description.

The resulting structure has the following properties:
The final tube weight = 4.5
Material Modulus (0 Deg.) = 12.5 Msi
Modulus (90.0 Deg) = 4.6
Modulus (45 Deg.) = 12.9
Density of Laminate = 1.57 g/cm³

EXAMPLE V

The following structure is an example of a composite member which is designed to resist combined bending and torsional loading. The structure is produced in a continuous fashion.

The materials used in this example are given below.

| Component (Ref. No.): | Inner-Ply Circumferential Fiber (18) |
| --- | --- |
| Material: | Carbon Fiber 12K |
| Type: | Toray T700S |
| Supplier: | Toray Industries |
| Properties: | Modulus = 33.5 Msi |
| | Density = 1.8 g/cm³ |
| | Max strain = 2.1% |
| Component (Ref. No.): | Axial Fiber (24A) |
| Material: | Carbon Fiber |
| Type: | 12k G30500 |

-continued

| | |
|---|---|
| Supplier: | BASF |
| Properties: | Modulus = 34 MSI |
| | Density = 1.77 g/cm$^3$ |
| Component (Ref. No.): | Axial Fiber (32) |
| Material: | Carbon Fiber |
| Type: | 12k G30500 |
| Supplier: | BASF |
| Properties: | Modulus = 34 MSI |
| | Density = 1.77 g/cm$^3$ |
| Component (Ref. No.): | Braiding Yarn (36A) |
| Material: | S2-Glass |
| Type: | S2CG1501/3 |
| Supplier: | Owens-Corning |
| Properties: | Modulus = 12.0 MSI |
| | Density = 2.48 g/cm$^3$ |
| Component (Ref. No.): | Braiding Yarn (36B) |
| Material: | S2-Glass |
| Type: | S2CG1501/3 |
| Supplier: | Owens-Corning |
| Properties: | Modulus = 12.0 MSI |
| | Density = 2.48 g/cm$^3$ |
| Component (Ref. No.): | Circumferential Fiber (40) |
| Material: | Carbon Fiber 12K |
| Type: | Toray T700S |
| Supplier: | Toray Industries |
| Properties: | Modulus = 33.5 Msi |
| | Density = 1.8 g/cm$^3$ |
| | Max strain = 2.1% |

The catalyst material used in this Example has a cure which is fast enough to harden the matrix while the composite is being pulled through the die assembly. For this example, the resin is:

Epoxy: Der 330, from Dow Chemical
Catalyst: AC-DP-1, from Anhydrides & Chemicals, Inc.

The die used in this example is fabricated from tool steel and has an inner bore of 3.1 cm. The die inner surface is chrome plated, and has a 25 RMS finish or finer. The length of the die is 75 cm. Throughout the manufacturing process the die is heated and maintained at a temperature of 150 degree Celcius.

The composite structure formed using the process of this example has the following properties:
Inner diameter: 2.5 cm
Outer diameter: 3.2 cm
Wall thickness: 0.35 cm
Number of plies: 7

The general manufacturing apparatus is as shown in FIG. 8 with the following additions and modifications: one braiding machine is positioned in front of winder station 52; one braider is positioned after station 52 and would rotate at 7.5 rpm in a clockwise direction, braiders two and three are positioned next; and, braider #5 rotates at 7.5 rpm in a counter-clockwise direction. There is a filament winding station like 66 in FIG. B. In addition, instead of the tape compacting machine 68, there is a heated die, 75 cm long, and a chop saw to cut the composite part to desired length.

The the manufacturing process proceeds as described below.

The mandrel used in this example is teflon anodized aluminum. The mandrel has constant diameter of 1.00 inch. It is supported as a cantilever from before the first braider.

The composite material is pulled through the heated die at a rate of 2 feet per minute.

Liquid epoxy resin and catalyst mix is applied to the mandrel at the position where fiber components 24A, 32, 36A, 36B are applied to the mandrel.

As the mandrel traverses through the first braider, the following fiber components are applied: 24 yarns of fiber 24A spaced in pairs equally about the mandrel, 48 yarns of fiber 32 equally spaced about the braiding machine, 24 ends yarn 36A rotating on the braiding apparatus in a clockwise fashion, and 24 ends of yarn 36B rotating on the braiding apparatus in a counter-clockwise fashion. The revolutions per minute of the 36A and 36B yarn is fixed at 1.9 rpm. In addition, the braiding apparatus #2 is rotating at 7.5 rpm in a clockwise direction.

At station 58A, the liquid epoxy resin and catalyst mix is applied to the mandrel at the position where the fiber component 18 is wrapped about the mandrel.

The fiber component 18 is wrapped about mandrel in a counter-clockwise direction at 7.5 rpm. Fiber winding apparatus 52 is loaded with sixteen dispensing packages, and the machinery rotates about the mandrel, as the mandrel is traversed through the process.

As the mandrel traverses through the second braider, the following fiber components are applied: 24 yarns of fiber 24A spaced in pairs equally about the mandrel, 48 yarns of fiber 32 equally spaced about the braiding machine, 24 ends yarn 36A rotating on the braiding apparatus in a clockwise fashion, and 24 ends of yarn 36B rotating on the braiding apparatus in a counter-clockwise fashion. The rpm of the 36A and 36B yarn is fixed at 1.9 rpm.

The liquid epoxy resin is liberally applied to the fibers as they are being braided about the mandrel at the braider.

As the mandrel traverses through braider #3 and braider #4, the following fiber components are applied: 24 yarns of fiber 24A spaced in pairs equally about the mandrel, 48 yarns of fiber 32 equally spaced about the braiding machine, 24 ends yarn 36A rotating on the braiding apparatus in a clockwise fashion, and 24 ends of yarn 36B rotating on the braiding apparatus in a counter-clockwise fashion. The revolutions per minute of the 36A and 36B yarn is fixed at 1.9 rpm.

The liquid epoxy resin is liberally applied to the fibers as they are being braided about the mandrel at braider #3 and braider #4.

The mandrel then traverses through braider #5. The following fiber components are applied: 24 yarns of fiber 24A spaced in pairs equally about the mandrel, 48 yarns of fiber 32 equally spaced about the braiding machine, 24 ends yarn 36A rotating on the braiding apparatus in a clockwise fashion, and 24 ends of yarn 36B rotating on the braiding apparatus in a counter-clockwise fashion. The revolutions per minute of the 36A and 36B yarn is fixed at 1.9 rpm. In addition, the braiding apparatus #5 is rotating at 7.5 rpm in a counter-clockwise direction.

The liquid epoxy resin is liberally applied to the fibers as they are being braided about the mandrel at the fifth braiding machine.

The fiber component 40 is wrapped about mandrel in a clockwise direction at 7.5 rpm.

At station 58E, the liquid epoxy resin and catalyst mix is applied to the mandrel at the position where the fiber component 18 is wrapped about the mandrel.

The mandrel and fiber plies, with uncured liquid epoxy thereon, then pass through a steel die which is common to the art. The die has a bored hole which is 3.2 cm in diameter, and the die is heated to 150 degrees Celcius. As the part is pulled through the die it cures, and once the structure has attained sufficient integrity it is cut to desired length with a cut-off saw familiar to those schooled in the art.

In order to fully catalyze the matrix material, the structure is then placed in a heated oven for 2 hrs. and 150 degrees Celcius.

The resulting structure has the following properties:
The final tube weight = 0.42 lbs/ft
Material Modulus (0 Deg.) = 14.5 Msi
Modulus (90.0 Deg) = 4.4 Msi
Modulus (45 Deg.) = 13.4 Msi
Density of Laminate = 1.5 g/cm$^3$ It will thus be seen that the objects set forth above, among those made apparent from the preceding description, are efficiently attained. Since certain changes may be made in carrying out the above manufacturing steps and in the composite structures set forth, without departing from the scope of the invention, all matter contained in the above description or shown in the accompanying drawings is to be interpreted as illustrative and not in a limiting sense.

It also is to be understood that the following claims are to cover all of the generic and specific features of the invention herein described, and all statements of the scope of the invention which as a matter of language, might be said to fall there between.

Having described the invention, what is claimed as new and secured by Letters Patent is:

1. A tubular composite structural member having a plurality of plies, each ply being defined by a fiber component disposed within a polymer matrix, said composite member having the improvement comprising
    A. at least one inner ply having circumferentially extending fibers,
    B. at least one outer ply having circumferentially extending fibers, and
    C. at least one intermediate ply having
        i) first axially extending fibers in circumferentially-spaced sets with circumferential gaps between each set of the first fibers, and
        ii) second axially extending fibers in circumferentially-spaced sets disposed in said circumferential gaps, each said second fiber being interwoven with helically oriented fibers,
    said inner, outer and intermdiate plies forming a tubular, elongate composite structural member.

2. A composite structural member according to claim 1 wherein the inner ply and the outer ply each contribute less than twenty-five percent to the total modulus of elasticity of the composite.

3. A composite structural member according to claim 2 having three said intermediate plies.

4. A composite structural member according to claim 1 wherein the diameter of the circumferentially extending fibers ranges between 0.007 inch and 0.040 inch.

5. A composite structural member according to claim 4 wherein the diameter of the axial fibers ranges between 0.007 inch and 0.040 inch.

6. A composite structural member according to claim 1 wherein the diameter of said helically oriented fibers is less than 25% that of said axially extending fibers.

7. A composite structural member according to claim 1 wherein said circumferential fibers are of a material selected from the group consisting of aramid fibers, carbon fibers, and glass fibers having a modulus of at least 10 million psi.

8. A composite structural member according to claim 1 wherein said axially extending fibers are of a material selected from the group consisting of carbon fiber, glass fiber, ceramic fiber, boron fiber and aramid fiber having a modulus of at least 12 million psi.

9. A composite structural member according to claim 1 wherein said helically oriented fibers are of a material selected from the group consisting of aramid fibers, carbon fibers and glass fibers having a modulus of at least 10 million psi.

10. A composite structural member according to claim 1 having a longitudinal axis and wherein said circumferential fibers are oriented at an angle of approximately ±30° to ±90° relative to the longitudinal axis of the member.

11. A composite structural member according to claim 10, wherein said axial fibers are oriented at an angle of approximately 0° to the longitudinal axis of the member.

12. The composite structural member according to claim 11 wherein said helically oriented fibers are oriented at an angle of approximately ±5° to ±60° relative to the longitudinal axis of the member.

13. A composite structural member according to claim 1 wherein the polymer matrix is of a material selected from the group consisting of epoxy, polyester and vinyl ester.

14. A composite structural member according to claim 1 wherein the polymer matrix is of a material selected from the group consisting of polyphenylene sulfide, polysulfone, polyethylene terephthalate, polypropylene, polycarbonate, acetal, nylon and polyetheretherketone.

15. A composite structural member according to claim 14 wherein the ratio by volume of resin in the polymer matrix to fiber is 1:1 or less.

16. A composite structural member according to claim 1 having a bending strength of at least 0.25% maximum laminate strain.

17. A nautical sail mast consisting of a composite structural member according to claim 1.

18. A whip antenna housing consisting of a composite structural member according to claim 1.

* * * * *